(12) United States Patent
Boswell et al.

(10) Patent No.: US 6,638,386 B2
(45) Date of Patent: *Oct. 28, 2003

(54) METHOD FOR MAKING HOLOGRAPHIC FOIL

(75) Inventors: David R. Boswell, Reading (GB); Michael J. Messmer, Toledo, OH (US)

(73) Assignee: Novavision, Inc., Bowling Green, OH (US)

( * ) Notice: Subject to any disclaimer, the term of this patent is extended or adjusted under 35 U.S.C. 154(b) by 58 days.

This patent is subject to a terminal disclaimer.

(21) Appl. No.: 09/838,589

(22) Filed: Apr. 18, 2001

(65) Prior Publication Data

US 2002/0003635 A1 Jan. 10, 2002

Related U.S. Application Data (63) Continuation-in-part of application No. 09/593,846, filed on Jun. 14, 2000, now Pat. No. 6,497,778.
(60) Provisional application No. 60/197,754, filed on Apr. 19, 2000.

(51) Int. Cl.[7] .................................................. B31F 1/07
(52) U.S. Cl. ................ 156/209; 156/220; 156/583.1; 428/457; 428/915; 428/916; 359/1; 283/101
(58) Field of Search ................ 156/209, 239–241, 156/230, 233, 235, 238, 157, 324, 297, 299, 580, 583.1, 555, 552, 553, 556; 428/195, 200, 209, 343, 346, 457, 458, 461, 462, 464, 446, 467, 484, 500, 913, 40.1, 41.7, 41.8, 42.1, 42.2, 42.3; 359/576, 1–35; 257/679; 361/737

(56) References Cited

U.S. PATENT DOCUMENTS

| | | | |
|---|---|---|---|
| 3,898,358 A | * | 8/1975 | Ryan et al. ................ 428/156 |
| 4,012,552 A | | 3/1977 | Watts |
| 4,225,211 A | | 9/1980 | Abe |
| 4,340,438 A | | 7/1982 | Davis |
| 4,357,395 A | | 11/1982 | Lifshin et al. |
| 4,378,141 A | | 3/1983 | Yevick |
| 4,477,312 A | | 10/1984 | Czichy |
| 4,495,232 A | | 1/1985 | Bauser et al. |
| 4,545,838 A | | 10/1985 | Minkus et al. |
| 4,603,937 A | | 8/1986 | Copp |
| 4,629,647 A | | 12/1986 | Sander |
| 4,631,222 A | | 12/1986 | Sander |
| 4,657,803 A | | 4/1987 | Pernicano |
| 4,701,235 A | | 10/1987 | Mitsam |

(List continued on next page.)

FOREIGN PATENT DOCUMENTS

| | | |
|---|---|---|
| CA | 2046711 | 1/1992 |
| DE | 3744650 | 7/1989 |
| DE | 4006276 | 10/1990 |
| EP | 145481 | 6/1985 |
| EP | 201323 | 11/1986 |
| EP | 420261 | 4/1991 |
| EP | 0 466 118 B1 | 1/1992 |
| EP | 0 945 280 A2 | 9/1999 |
| GB | 2220386 | 1/1990 |
| WO | WO 9108524 | 6/1991 |
| WO | WO 9316888 | 9/1993 |
| WO | WO 9324332 | 12/1993 |
| WO | WO 9400803 | 1/1994 |

*Primary Examiner*—Michael W. Ball
*Assistant Examiner*—Jessica Rossi
(74) *Attorney, Agent, or Firm*—Emch, Schaffer, Schaub & Porcello Co., LPA (57) ABSTRACT

A composite sheet having the capability of having embossed therein a holographic image or diffraction grating image has a structure of multiple layers including a plastic film carrier, lacquer, metal and, optionally, a lacquer overlay. It may be adhered to a substrate without the necessity of removing the plastic film carrier and may have a holographic image embossed therein during the step of adhering or in a separate operation at a different time and may have printing applied to the layer of metal or to the lacquer overlay.

12 Claims, 12 Drawing Sheets

U.S. PATENT DOCUMENTS

| | | | |
|---|---|---|---|
| 4,717,615 A | 1/1988 | Reinhart | |
| 4,725,111 A | 2/1988 | Weitzen et al. | |
| 4,728,377 A | 3/1988 | Gallagher | |
| 4,758,296 A | 7/1988 | McGrew | |
| 4,759,969 A | 7/1988 | Sander | |
| 4,773,718 A | 9/1988 | Weitzen et al. | |
| 4,778,262 A | 10/1988 | Haines | |
| 4,832,445 A | 5/1989 | Haines et al. | |
| 4,837,072 A | 6/1989 | Kraetschmer | |
| 4,856,857 A | 8/1989 | Takeuchi et al. | |
| 4,877,710 A | 10/1989 | Ishikawa | |
| 4,892,602 A | 1/1990 | Oike et al. | |
| 4,893,887 A | 1/1990 | Coates | |
| 4,900,111 A | 2/1990 | D'Amato et al. | |
| 4,908,285 A | 3/1990 | Kushibiki et al. | |
| 4,913,504 A | 4/1990 | Gallagher | |
| 4,913,858 A | 4/1990 | Miekka et al. | |
| 4,921,319 A | 5/1990 | Mallik | |
| 4,933,120 A | 6/1990 | D'Amato et al. | |
| 4,969,700 A | 11/1990 | Haines | |
| 4,971,646 A | 11/1990 | Schell et al. | |
| 4,976,799 A | 12/1990 | Wood | |
| 4,978,593 A | 12/1990 | Yin et al. | |
| 4,990,415 A | 2/1991 | Yu | |
| 4,994,131 A | 2/1991 | Edwards | |
| 5,003,915 A | 4/1991 | D'Amato et al. | |
| 5,011,707 A | 4/1991 | Schell et al. | |
| 5,013,494 A | 5/1991 | Kubo et al. | |
| 5,013,632 A | 5/1991 | Weber | |
| 5,044,707 A | 9/1991 | Mallik | |
| 5,053,260 A | 10/1991 | Brehm | |
| 5,063,658 A | 11/1991 | Wild | |
| 5,071,597 A | 12/1991 | D'Amato et al. | |
| 5,083,850 A | 1/1992 | Mallik et al. | |
| 5,085,514 A | 2/1992 | Mallik et al. | |
| 5,087,510 A | 2/1992 | Tokas et al. | |
| 5,116,548 A | 5/1992 | Mallik et al. | |
| 5,128,779 A | 7/1992 | Mallik | |
| 5,142,383 A | 8/1992 | Mallik | |
| 5,145,212 A | 9/1992 | Mallik | |
| 5,155,604 A | 10/1992 | Miekka et al. | |
| 5,162,927 A | 11/1992 | Moss et al. | |
| 5,164,227 A | 11/1992 | Miekka et al. | |
| 5,172,250 A | 12/1992 | Tsuchiya et al. | |
| 5,186,787 A | 2/1993 | Phillips et al. | |
| 5,189,531 A | 2/1993 | Palmer et al. | |
| 5,191,449 A | 3/1993 | Newswanger | |
| 5,194,971 A | 3/1993 | Haines | |
| 5,199,744 A | 4/1993 | Shenton | |
| 5,300,169 A | 4/1994 | Tahara | |
| 5,464,690 A * | 11/1995 | Boswell | 428/334 |
| 5,756,183 A | 5/1998 | Kutsch et al. | |
| 5,810,957 A | 9/1998 | Boswell | |
| 5,889,598 A | 3/1999 | Monaghan | |
| 5,913,543 A * | 6/1999 | Curiel | 283/94 |
| 6,497,778 B1 * | 12/2002 | Boswell | 156/209 |

* cited by examiner

METHOD FOR MAKING HOLOGRAPHIC FOIL

CROSS REFERENCE TO RELATED APPLICATION

This application is a continuation-in-part of application Ser. No. 09/593,846 filed Jun. 14, 2000, now U.S. Pat. No. 6,497,778, in the name of David R. Boswell which is based upon and claims priority from the filing date of U.S. Provisional Application No. 60/197,754, filed Apr. 19, 2000.

DESCRIPTION

HOLOGRAPHIC FOIL AND METHOD

The present invention is directed to a new foil which may be applied to a substrate and thereafter have embossed thereon a holographic image or diffraction grating image and printing over said holographic image or diffraction grating image and to a method of forming and using.

BACKGROUND OF THE INVENTION

The prior U.S. Pat. No. 5,464,690 of David R. Boswell discloses a foil of a composite sheet suitable for having directly applied thereto a holographic image or diffraction grating image immediately following transfer of such composite sheet from a carrier film to a substrate to which such composite sheet is adhered. Under that invention, the composite sheet is releasably affixed to a carrier film of polyester, polypropylene or similar material and has an adhesive layer on the surface opposite the carrier film. The composite sheet of such prior invention may be transferred by heat stamping the combined composite sheet and carrier film against a substrate to which it is desired to have the composite sheet or a small portion thereof affixed. A heated die engages the carrier film urging the composite sheet into firm engagement with the substrate. Heat from the heated die causes the adhesive layer of the composite sheet to become activated and thereby adhesively engage the composite sheet to the substrate. The heated die also causes the composite sheet portion engaged by the heated die to separate from the carrier film thereby leaving a metal layer of such composite sheet exposed for engagement by a shim bearing a holographic image or diffraction grating image. The shim, carried by a second heated die, engages the metal layer directly; however, it is possible that there will be some residue of a wax if the composite sheet were provided with a wax release coating between the layer of metal and the carrier sheet. The shim bearing the holographic image or diffraction grating image embosses such image into the metal layer and the underlying lacquer layer of the composite sheet adhered to the substrate.

U.S. Pat. Nos. 5,674,580, 5,643,678 and 5,653,349 are directed to modifications to the invention disclosed in U.S. Pat. No. 5,464,690.

DISCLOSURE OF THE INVENTION

Under the invention disclosed in the parent application Ser. No. 09/593,846, there is provided a modified composite sheet having a construction permitting the direct application of such composite sheet to a substrate and, if desired, simultaneous embossing of a holographic image or diffraction grating image to such composite sheet engaged to the substrate without the necessity of removing a carrier film therefrom. The composite sheet and method of the present invention eliminate the step of transferring the composite sheet from a carrier film to the substrate as the composite sheet of the present invention does not require use of a releasable carrier film. The construction of the composite sheet of the present invention is such as to permit the embossing of a holographic image or diffraction grating image without the necessity of first separating the composite sheet from a carrier film. The composite sheet of the present invention is particularly advantageous for those situations in which it is desired to supply the composite sheet for interfacial engagement to the substrate in the form of a discrete sheet or section as opposed to being supplied from a roll. It can be provided in relatively large sizes, for example, on the order of 40 inches by 60 inches.

The present continuation-in-part application includes improved embodiments of construction of the composite sheet and method of forming and use. The composite sheet of the present invention has the capability of being adhered to a substrate by heating, pressing or stamping without the necessity of removing the plastic film carrier and having a holographic image embossed therein, either prior to or during the step of heat, pressing or stamping or in a separate operation at a different time. The composite sheet having been adhered to a substrate and having embossed thereon a holographic image or diffraction grating image can further be color printed, UPC bar coded, consecutively numbered and/or cut to size in registration to the embossed holographic image.

DETAILED DESCRIPTION OF THE INVENTION

Figure 1:
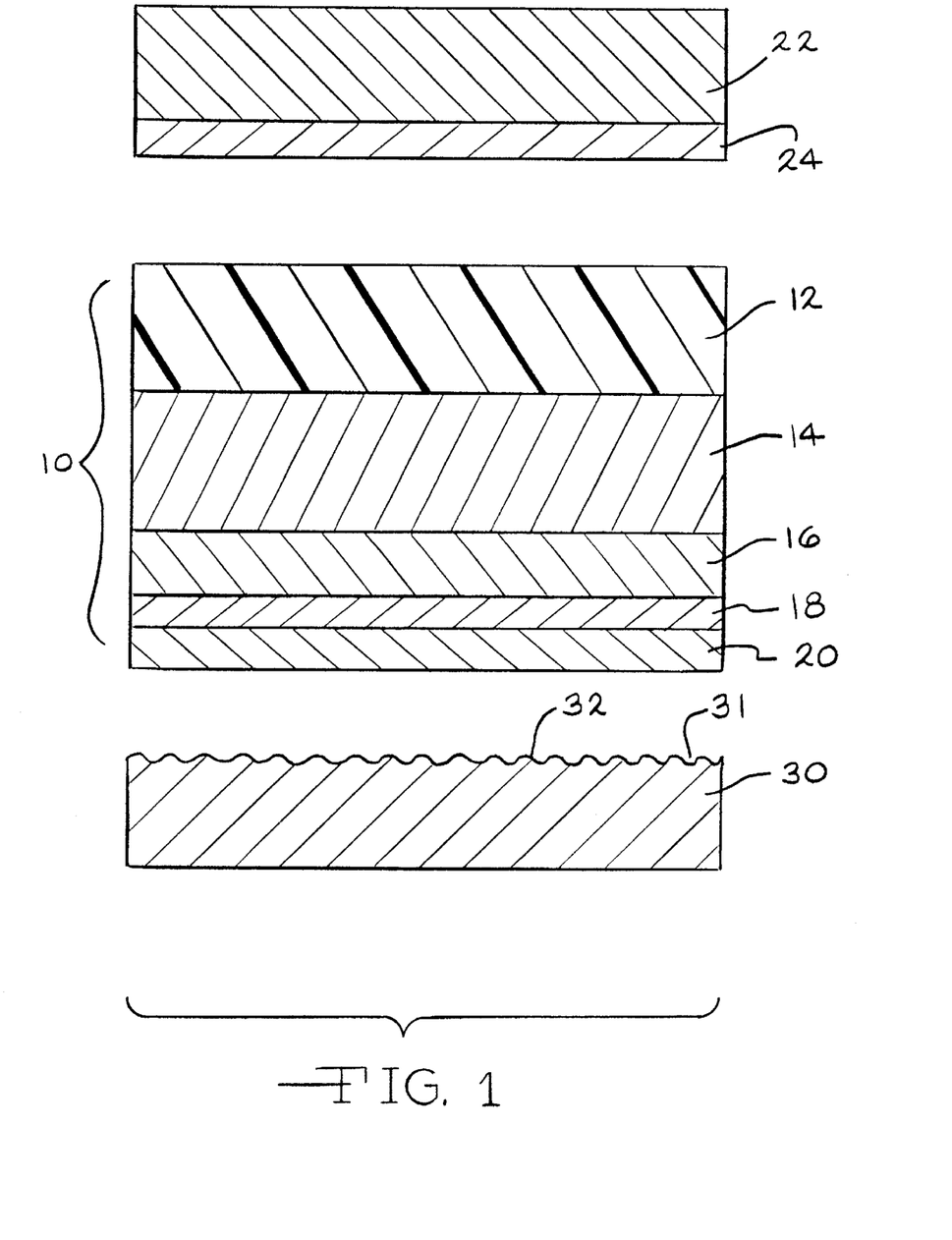
FIG. 1 is a schematic sectional view showing the composite sheet of the present invention positioned to engage a substrate spaced therefrom and showing a shim having a holographic image or diffraction grating image formed therein spaced from the opposing side of the composite sheet.
Figure 2:
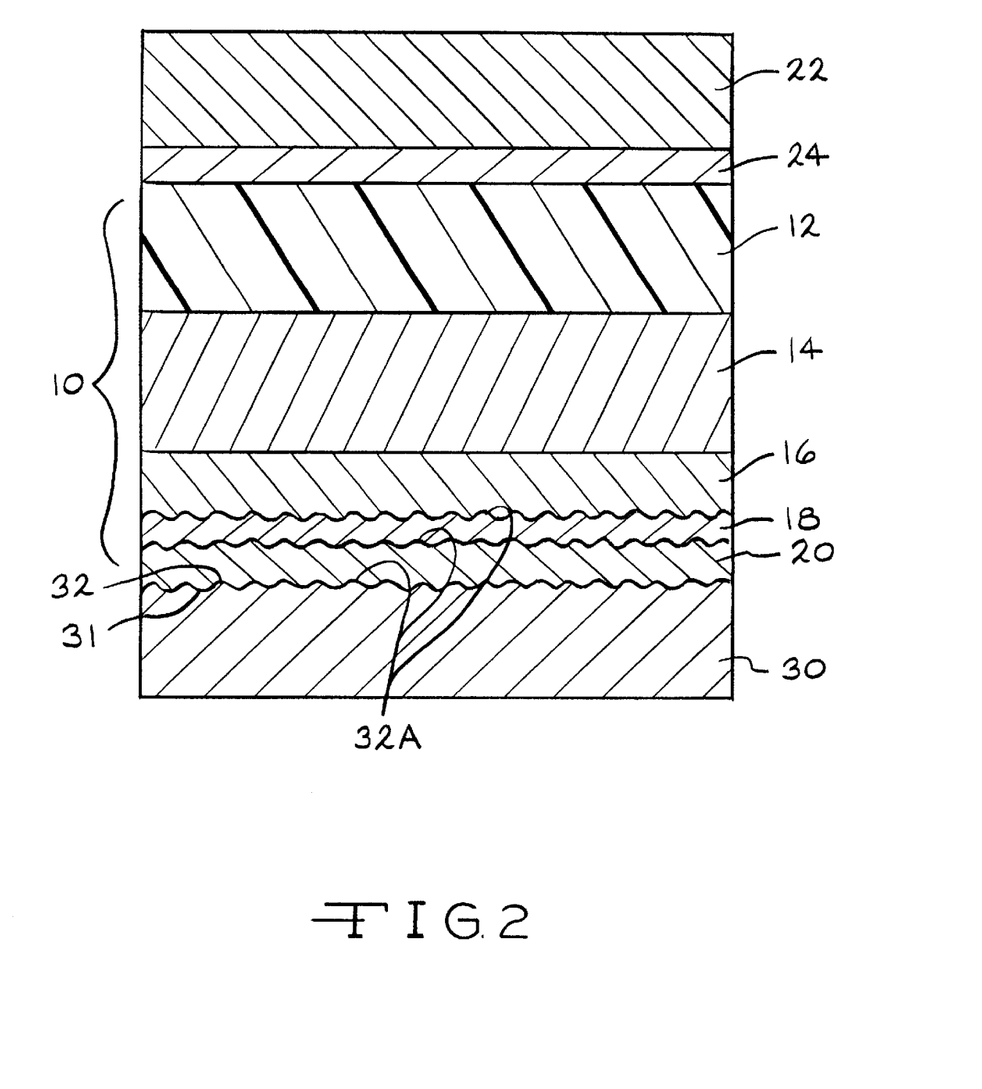
FIG. 2 is a view similar to FIG. 1 showing the shim engaged to the composite sheet forcing the composite sheet under heat and pressure into engagement with the substrate and a layer of adhesive applied to such substrate while at the same forming a holographic image or diffraction grating image into layers of wax, metal and lacquer of the composite sheet.

Referring to FIGS. 1 and 2, there is shown a composite sheet generally designated by the numeral 10. The composite sheet 10 comprises a carrier film 12 having a thickness in the preferred range of 12 microns to 125 microns and potentially as thick as 250 microns. The carrier film 12 may be formed of one of a number of different types of material including a film of polyester such as polyethylene terephthalate or a film of bi-axially oriented polypropylene, cellulose triacetate, polystyrene, polyethylene or polyvinylchloride. A first lacquer layer 14 having a thickness in the range of 0.5 to 3 microns is applied to the carrier film 12. The first layer of lacquer 14 is preferably a thermal softening lacquer applied from solution and containing acrylic and/or nitrocellulose and/or chlorinated rubber.

A second layer of lacquer 16 having a thickness in the range of 0.05 microns to 0.2 microns is applied to the first layer of lacquer 14. The second layer of lacquer may be formed of the same material as the first layer of lacquer 14.

A layer of metal 18 having a thickness in the range of 20 millimicrons to 100 millimicrons is applied to the second layer of lacquer 16. The layer of metal 18 is preferably aluminum; however, it could be stainless steel, nichrome, gold, silver, platinum or any other metal which could be vaporized and deposited by vacuum deposition or applied by sputter or electron beam deposition.

A wax coating 20 is applied over the metal layer 18. The wax coating 20 may be a microcrystalline wax or a partially saponified montan wax or, if desired, siloxane and preferably has a thickness in the range of 0.025 micron to 1 micron.

In use, the composite sheet 10 may be adhered to a substrate 22 such as paper, paperboard, fiberboard, plastic or other desired material. A layer of adhesive 24 is applied to the substrate 22 and functions to adhere the composite sheet 10 thereto. The adhesive 24 is preferably a heat activated adhesive and could be a water based adhesive, a solvent based adhesive or a hot melt adhesive.

A shim 30 having a face 31 with a holographic image or a diffraction grating image embossment 32 formed therein is positioned such that the holographic or diffraction grating image embossment 32 faces the wax layer 20 of the composite sheet 10. As schematically represented in FIG. 2, the face 31 of shim 30 and the holographic image or diffraction grating image embossment 32 is urged against the composite sheet 10 under heat and pressure to force the composite sheet 10 into engagement with the adhesive layer 24 engaged to the substrate 22. Such application under heat and pressure activates the adhesive 24 thereby causing the composite sheet 10 to become adhered to the substrate 22 while at the same time causing the holographic image or diffraction grating image embossment 32 of the shim 30 to emboss a holographic image or diffraction grating image 32A into the layer of wax 20, the layer of metal 18 and partially into the second layer of lacquer 16 to form a holographic image or diffraction grating image in the composite sheet 10 engaged to the substrate 22. The layer of wax 20 functions to prevent any particles of metal from the layer of metal 18 from reaching the face 31 or the holographic image or diffraction grating image embossment 32 formed in the face 31 of the shim 30. As will be appreciated by those skilled in the art, the transfer of metal particles from the layer of metal 18 to the holographic image or diffraction grating image embossment 32 of the shim 30 could adversely affect the quality of the holographic image or diffraction grating image embossed 32A into the composite sheet 10.

Figure 3:
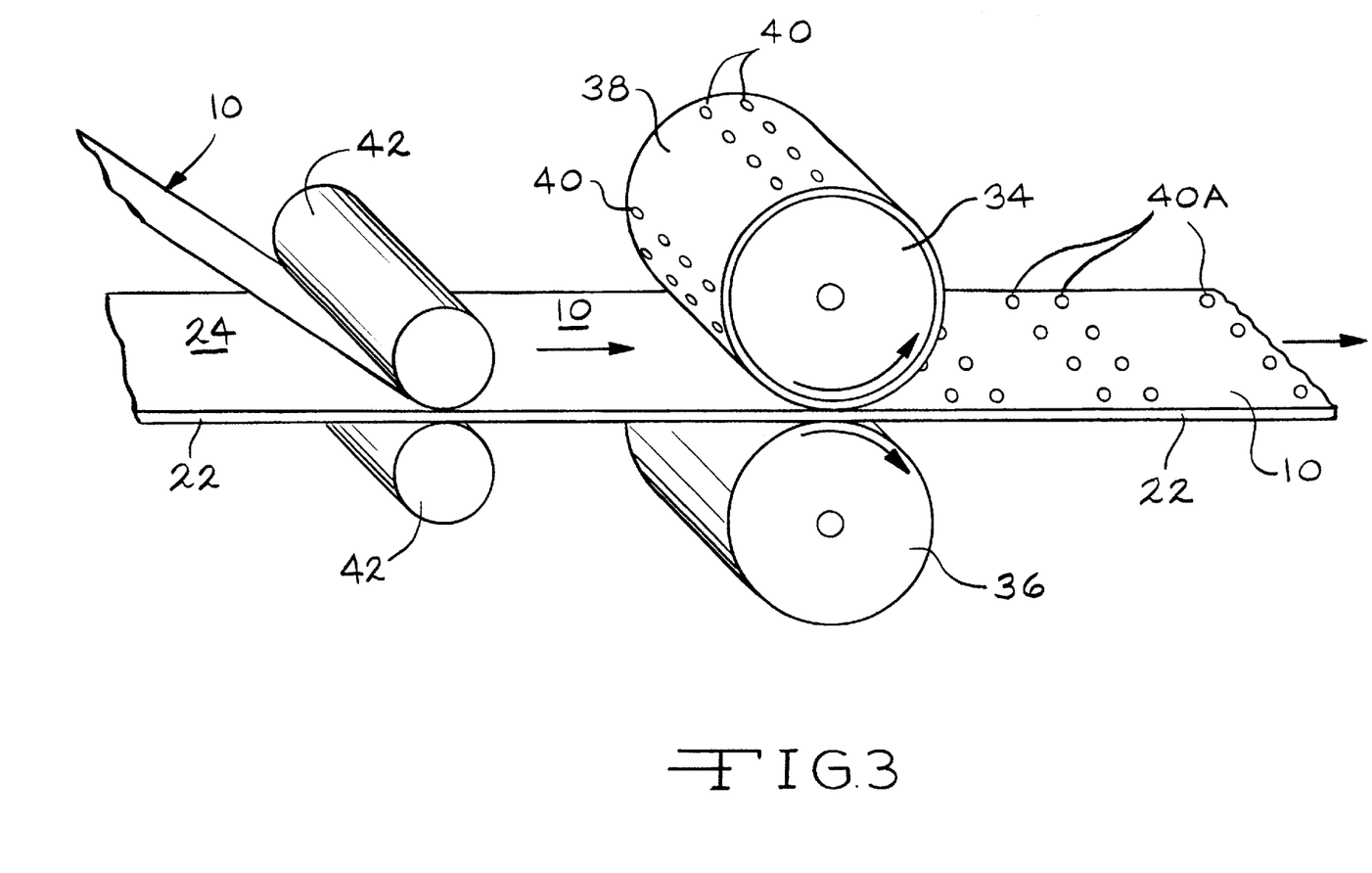
FIG. 3 is a schematic view, in perspective, showing the composite sheet and a substrate being fed between the nip of a pair of rollers, the upper one of which is heated and has a shim bearing one or more holographic images or diffraction grating images.

Referring to FIG. 3, there is shown schematically one form of apparatus for engaging the composite sheet 10 to a substrate and embossing a holographic image or diffraction grating image into the composite sheet 10. As shown in FIG. 3, there is provided a heated roller 34 and an anvil roller 36. The heated roller 34 is shown as having a shim 38 affixed circumferentially therearound. The shim 38 is shown as having a plurality of holographic image or diffraction grating image embossments 40 formed therein.

As shown in FIG. 3, a length of substrate 22 having adhesive 24 facing upwardly is fed from a source of supply, such as a supply roll, between the nip of the heated roller 34 and anvil roller 36. Composite sheet 10 is fed from a supply roll or other source of supply between a pair of idler rollers 42 where it engages the adhesive layer 24 of substrate 22. The composite sheet 10 is facing such that the carrier film 12 contacts the adhesive layer 24 and when so engaged the substrate 22 and composite sheet 10 are passed between the nip of the heated roller 34 and anvil roller 36. The heated roller 34 activates the heat activatible adhesive of the adhesive layer 24 thereby causing the composite sheet 10 to become adhered to the substrate 22. Additionally, the holographic image or diffraction grating image embossments 40 of the shim 38 emboss holographic images or diffraction grating images 40A into the layer of wax 20, layer of metal 18 and second layer of lacquer 16.

Figure 4:
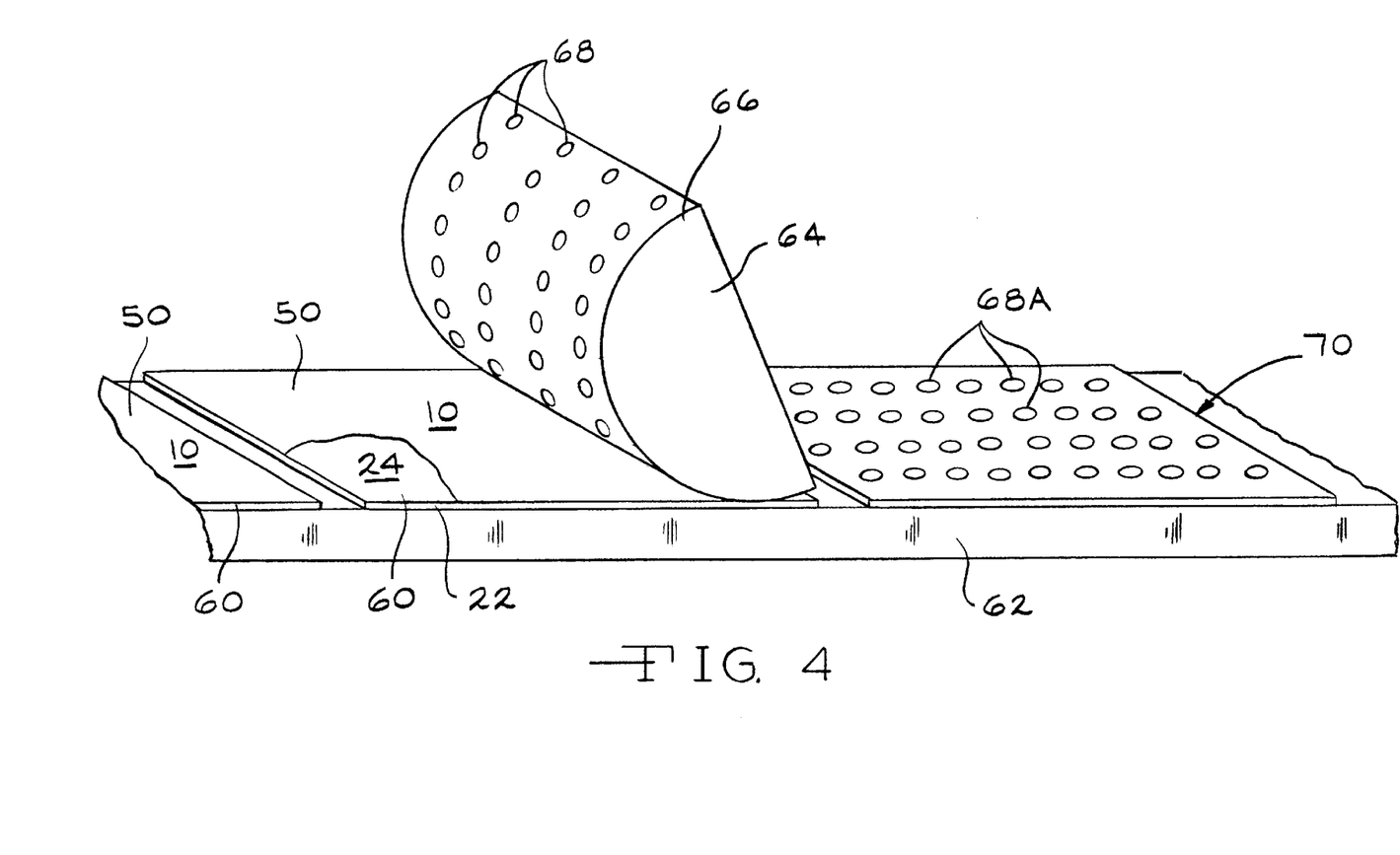
FIG. 4 is a schematic view, in perspective, showing the successive feeding of discrete sheets of (1) substrate and (2) composite sheets to a heated semi-cylindrical roller having a shim bearing one or more holographic images or diffraction grating images.

Referring to FIG. 4, there is shown schematically one form of apparatus for affixing a succession of discrete sections 50 of composite sheet material 10 to discrete sections 60 of substrate 22 coated with adhesive 24.

As shown in FIG. 4, discrete sections 60 of the adhesive coated substrate 22 with the adhesive layer 24 facing up are fed successively on a flat support member 62 to a heated semi-cylindrical roller 64 having affixed to its outer periphery a shim 66 in which has been engraved a plurality of holographic image or diffraction grating image embossments 68. Following positioning of the joined discrete section 50 of composite sheet 10 and discrete section 60 of substrate 22, the semi-cylindrical roller 64 is caused to roll throughout its semi-cylindrical extent over the surface of the discrete sheet 50. The semi-cylindrical roller 64 is heated and presses the discrete section 50 against the discrete section 60 thereby adhering such discrete section 50 to the underlying discrete section 60 of substrate 22 while at the same time causing the embossments 68 to form holographic or diffraction grating images 68A into the layer of wax 20, layer of metal 18 and second layer of lacquer 16 of the discrete section 50 of the composite sheet 10. The semi-cylindrical roller 64 may then be removed from contact with the newly embossed and joined final product 70 thereby permitting such final product 70 to be moved down-stream on the flat support member 62 and the next discrete section 60 of substrate 22 with a discrete section 50 of composite sheet 10 supported thereon be moved to a position for engagement by the semi-cylindrical roller 64.

If desired, the shim engraved with holographic or diffraction grating images could be positioned on the flat support member 62. In that case, the discrete sections 50 of composite sheet 10 affixed to the discrete sections 60 of substrate 22 would be inverted from that shown in FIG. 4.

As will be readily appreciated by those skilled in the art, a flat, heated stamping die with a shim having embossments thereon and mounted for reciprocal movement engaged to and disengaged from successive joined discrete sections 50 of composite sheet 10 and discrete sections 60 of substrate 22 may be used in place of the semi-cylindrical roller 64 for adhering the discrete sections 50 to the discrete sections 60. The stamping could be done either in-line or off-line.

The composite sheet 10 of the present invention and the method disclosed in FIGS. 3 and 4 for simultaneously applying the composite sheet to a substrate while at the same time embossing holographic images or diffraction grating images therein is very efficient as it provides a one-step operation for simultaneously accomplishing both functions of (1) adhering the composite sheet 10 to the substrate 22 and (2) embossing the holographic images or diffraction grating images 40A and 68A without the necessity of separating or transferring the composite sheet from a carrier film. It is also has the advantage that it permits the party applying the composite sheet to a substrate to maintain possession of and control over the shim bearing the holographic images or diffraction grating images thus assuring that such party's proprietary holographic images are maintained secure.

If desired, however, the composite sheet of the present invention could have the holographic images or diffraction grating images embossed thereon prior to application of the composite sheet to a substrate. In that instance, when it was desired to affix the pre-embossed composite sheet to a substrate, such pre-embossed composite sheet could be readily affixed to the desired substrate by conventional methods well known in the art such as by hot stamping or by passing the joined pre-embossed composite sheet and a substrate through the nip of a pair of smooth rollers to apply pressure for adhesion. If desired, one or both rollers may be heated.

It is also possible to adhere the composite sheet of the present invention to a substrate and then, in a separate operation, possibly at a later time, emboss the holographic image or diffraction grating image into the composite sheet while it is affixed to the substrate.

The present composite sheet invention is particularly well suited for use in large sheets including ones as much as 60" wide. Although FIG. 3 describes the composite sheet as being supplied from a supply roll, as can be seen in FIG. 4 it can also be supplied in the form of sheets. Additionally, although FIGS. 3 and 4 shows a plurality of holographic images or diffraction grating images 40A and 68A embossed in the composite sheet 10 adhered to substrate 22, it would be possible to have a holographic image or diffraction grating image cover the entire width and length of the composite sheet adhered to the substrate.

Figure 5:
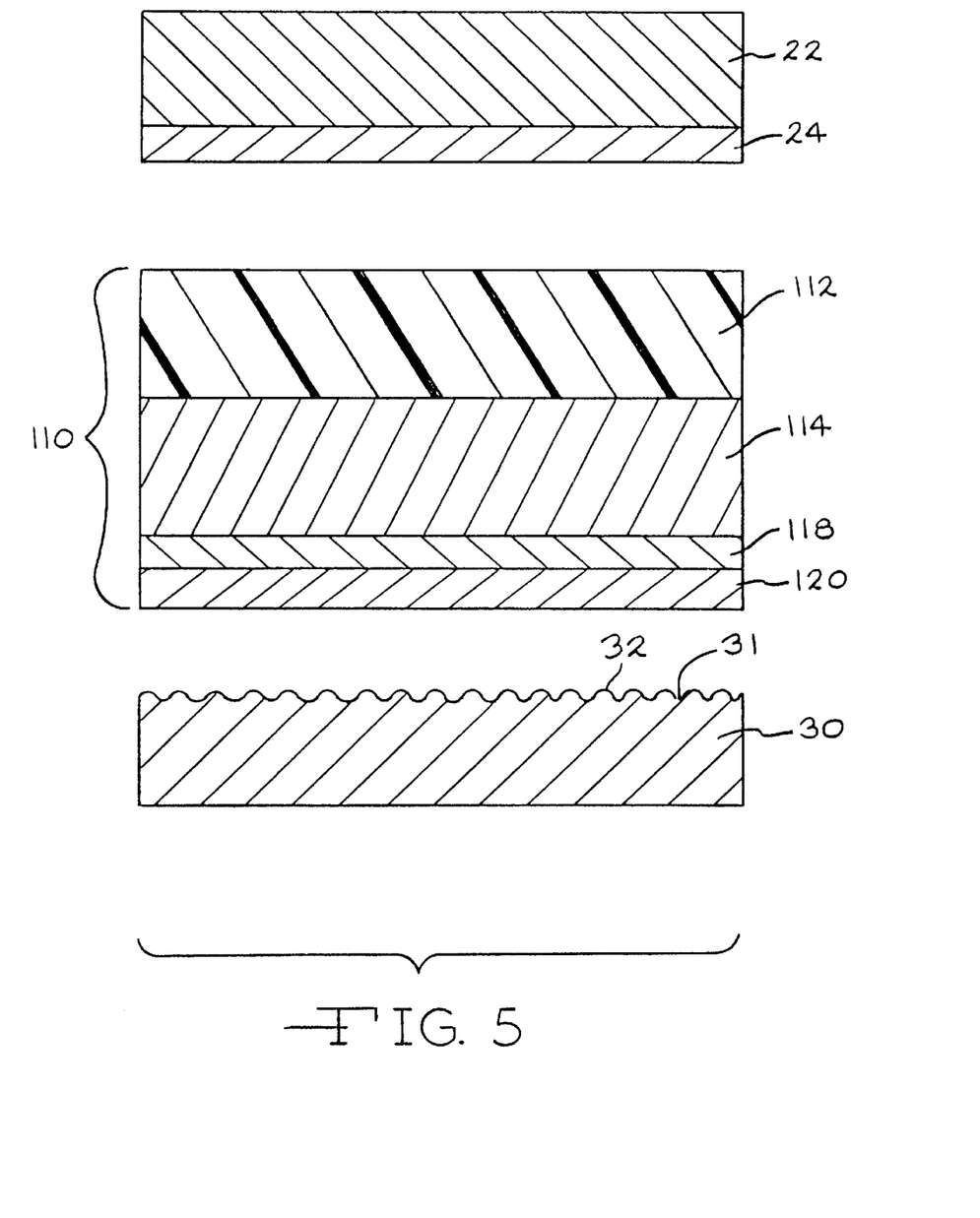
FIG. 5 is a view similar to FIG. 1 showing a modified composite sheet.
Figure 6:
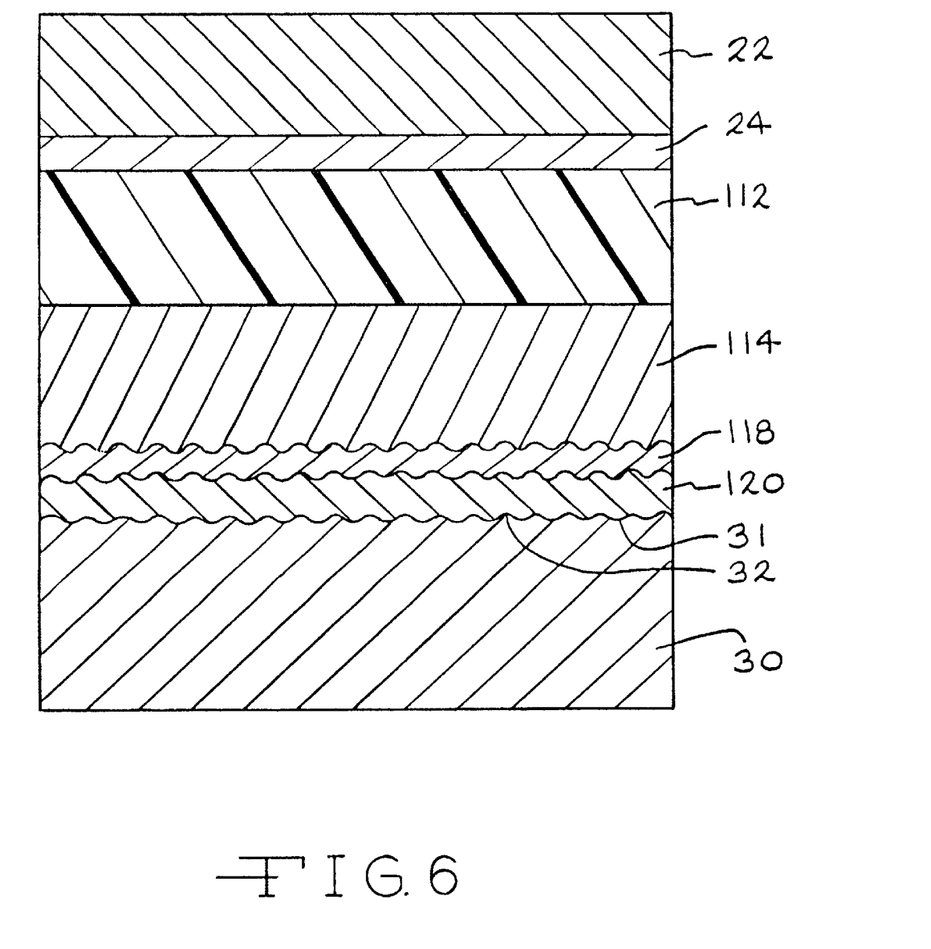
FIG. 6 is a view showing the shim engaged to the modified composite sheet.

Referring to FIGS. 5 and 6, there is shown a modified composite sheet generally designated by the numeral 110. The composite sheet 110 comprises a carrier film 112 having a thickness in the preferred range of 12 microns to 125 microns and potentially as thick as 250 microns. The carrier film 112 may be formed of one of a number of different types of material including a film of polyester such as polyethylene terephthalate or a film of bi-axially oriented polypropylene, cellulose triacetate, polystyrene, polyethylene or polyvinylchloride. A lacquer layer 114 having a thickness in the range of 0.5 to 3 microns is applied to the carrier film 112. The layer of lacquer 114 is preferably a thermal softening lacquer applied from solution and containing acrylic and/or nitrocellulose and/or chlorinated rubber.

A layer of metal 118 having a thickness in the range of 20 millimicrons to 100 millimicrons is applied to the layer of lacquer 114. The layer of metal 118 is preferably aluminum; however, it could be stainless steel, nichrome, gold, silver, platinum or any other metal which could be vaporized and deposited by vacuum deposition or applied by sputter or electron beam deposition.

A wax coating 120 is applied over the metal layer 118. The wax coating 120 may be a microcrystalline wax or a partially saponified montan wax or, if desired, siloxane and preferably has a thickness in the range of 0.025 micron to 1 micron.

In use, the modified composite sheet 110 may be adhered to a substrate 22 such as paper, paperboard, fiberboard, plastic or other desired material. A layer of adhesive 24 is applied to a substrate 22 and functions to adhere the composite sheet 110 thereto.

The shim 30 having a face 31 with a holographic image or a diffraction grating image embossment 32 formed therein is positioned such that the holographic or diffraction grating image embossment 32 faces the wax layer 120 of the composite sheet 110. As schematically represented in FIG. 6, the face 31 of the shim 30 and the holographic image or diffraction grating image embossment 32 is urged against the composite sheet 110 under heat and pressure to force the composite sheet 110 into engagement with the adhesive layer 24 engaged to the substrate 22. Such application under heat and pressure activates the adhesive 24 thereby causing the composite sheet 110 to become adhered to the substrate 22 while at the same time causing the holographic image or diffraction grating image embossment 32 of the shim 30 to emboss a holographic image or diffraction grating image into the layer of was 120, the layer of metal 118 and partially into the layer of lacquer 114 to form a holographic image or diffraction grating image in the composite sheet 110 engaged to the substrate 22.

Figure 7:
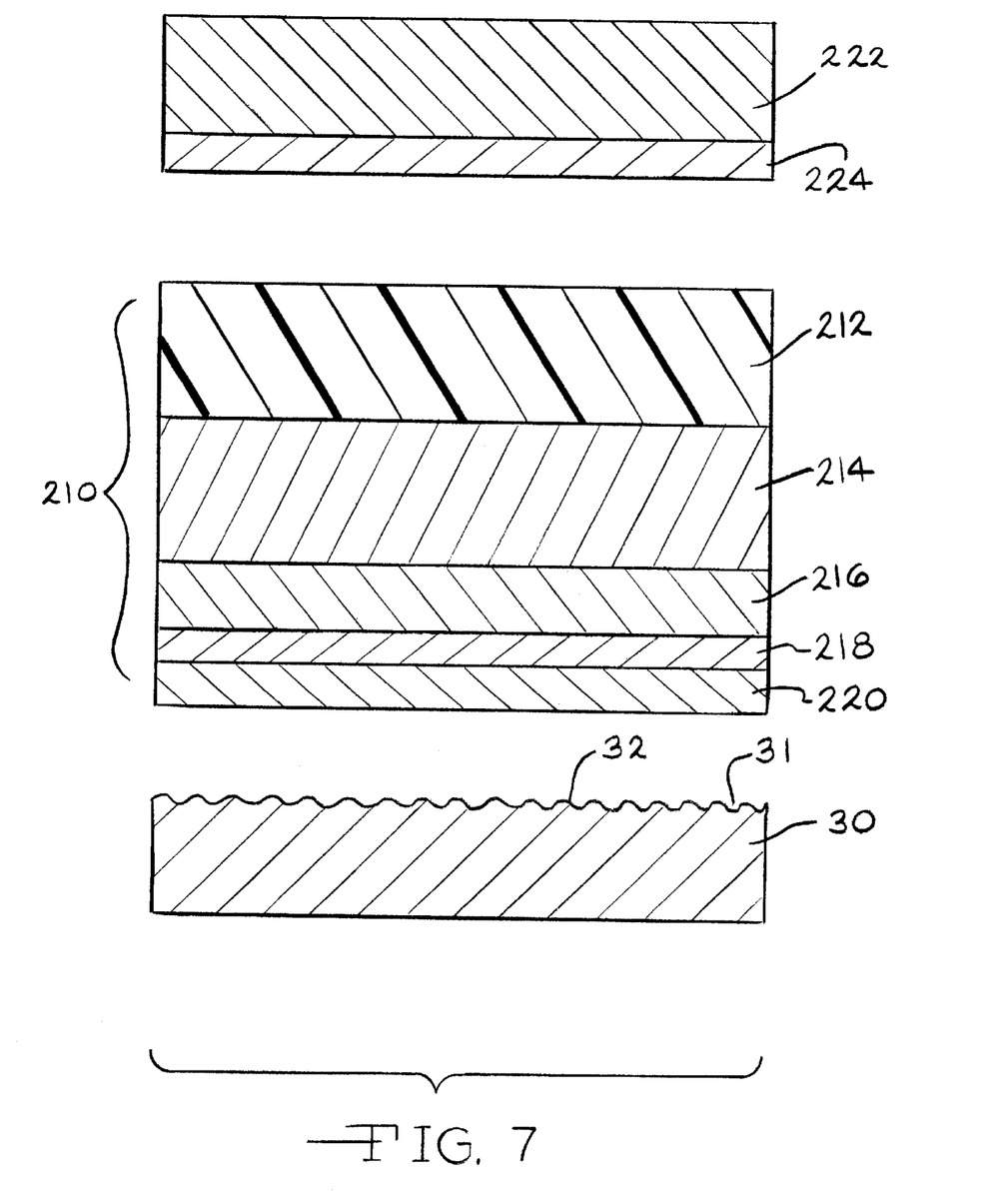
FIG. 7 is a view similar to FIG. 1 showing a further modified composite sheet.
Figure 8:
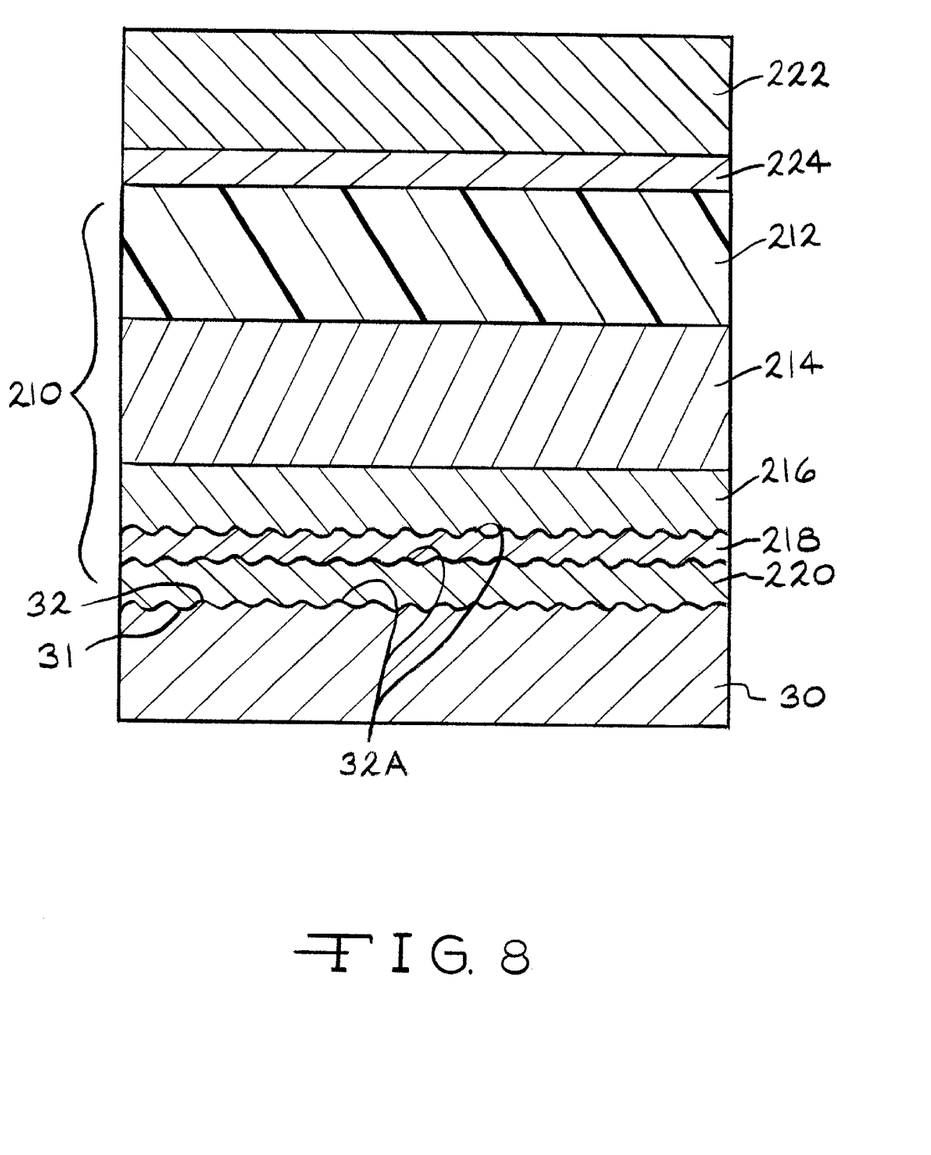
FIG. 8 is a view similar to FIG. 7 showing the shim engaged to the composite sheet forcing the composite sheet under heat and pressure into engagement with the substrate and a layer of adhesive applied to such substrate while at the same forming a holographic image or diffraction grating image into layers of acrylic lacquer, metal and lacquer of the composite sheet.

Referring to FIG. 7, there is shown another embodiment of composite sheet generally designated by the numeral 210. The composite sheet 210 comprises a carrier film 212 having a thickness in the preferred range of 12 microns to 125 microns and potentially as thick as 250 microns. The carrier film 212 may be formed of one of a number of different types of material including a film of polyester such as polyethylene terephthalate or a film of bi-axially oriented polypropylene, cellulose triacetate, polystyrene, polyethylene or polyvinylchloride. A first lacquer layer 214 having a thickness in the range of 0.5 to 3 microns is applied to the carrier film 212. The first layer of lacquer 214 is preferably a thermal softening lacquer applied from solution and containing acrylic and/or nitrocellulose and/or chlorinated rubber.

A second layer of lacquer 216 having a thickness in the range of 0.05 microns to 0.2 microns is applied to the first layer of lacquer 214. The second layer of lacquer may be formed of the same material as the first layer of lacquer 214.

A layer of metal 218 having a thickness in the range of 20 millimicrons to 100 millimicrons is applied to the second layer of lacquer 216. The layer of metal 218 is preferably aluminum; however, it could be stainless steel, nichrome, gold, silver, platinum or any other metal which could be vaporized and deposited by vacuum deposition or applied by sputter or electron beam deposition.

In a preferred embodiment, an acrylic lacquer overlay coating 220 is applied over the metal layer 218. If desired, the lacquer overlay 220 could be one of the other materials specified for the first layer of lacquer 214. The coating 220 has a thickness in the range of one (1) millimicron to three (3) microns. The advantage of lacquer for the overlay coating 220 over the wax coating 20 of the embodiment of FIG. 1 is that the lacquer overlay 220 (i) inhibits, to a high degree, corrosion of the layer of metal and (ii) serves as an excellent primer to enhance adhesion of ink in a subsequent printing operation.

Additionally, both the wax/siloxane coating materials of the embodiment of FIG. 1 and the lacquer overlay 220 are excellent at minimizing shim contamination. The lacquer overlay 220 can be pre-applied to the sheet or it can be applied onto the layer of metal in-line prior to embossing the holographic image. If desired, for some applications, the lacquer overlay coating 220 may be omitted and the holographic image embossed directly into the layer of metal 218.

In use, the composite sheet 210 may be adhered to a substrate 222 such as paper, paperboard, fiberboard, plastic or other desired material. A layer of adhesive 224 is applied to the substrate 222 and functions to adhere the composite sheet 210 thereto. The adhesive 224 is preferably a heat activated adhesive but could also be a water based adhesive, a solvent based adhesive, a hot melt adhesive or a pressure sensitive adhesive.

A shim 30 having a face 31 with a holographic image or a diffraction grating image embossment 32 formed therein is positioned such that the holographic or diffraction grating image embossment 32 faces the acrylic lacquer layer 220 of the composite sheet 210. As schematically represented in FIG. 7, the face 31 of shim 30 and the holographic image or diffraction grating image embossment 32 is urged against the composite sheet 210 under heat and pressure to force the composite sheet 210 into engagement with the adhesive layer 224 engaged to the substrate 222. Such application under heat and pressure activates the adhesive 224 thereby causing the composite sheet 210 to become adhered to the substrate 222 while at the same time causing the holographic image or diffraction grating image embossment 32 of the shim 30 to emboss a holographic image or diffraction grating image 32A into the lacquer overlay 220, the layer of metal 218 and partially into the second layer of lacquer 216 to form a holographic image or diffraction grating image in the composite sheet 210 engaged to the substrate 222. If the adhesive used for the adhesive layer 224 is a pressure sensitive or other adhesive not requiring heat activation, it is possible to adhere the composite sheet 210 to the substrate 222 without heat. Heat and pressure will be required in order to emboss a holographic or diffraction grating image. The lacquer overlay 220 functions to prevent any particles of metal from the layer of metal 218 from reaching the face 31 or the holographic image or diffraction grating image embossment 32 formed in the face 31 of the shim 30. Additionally, as previously discussed, the lacquer overlay 220 provides significant additional advantages in that it protects the metal layer 218 against corrosion (as frequently occurs on material in inventory exposed to high humidity) and it provides a primer for enhanced ink adhesion for a subsequent printing operation.

If the composite sheet 210 of the embodiment which does not have the lacquer overlay 220 is used, the face 31 of the shim 30 will directly contact the layer of metal 218. Tests have shown that thousands of holographic images can be embossed into a composite sheet 210 that does not have the lacquer overlay without an indication of contamination from the directly contacted layer of metal 218. However, for long runs, it is preferred to have a lacquer overlay 220.

Figure 9:
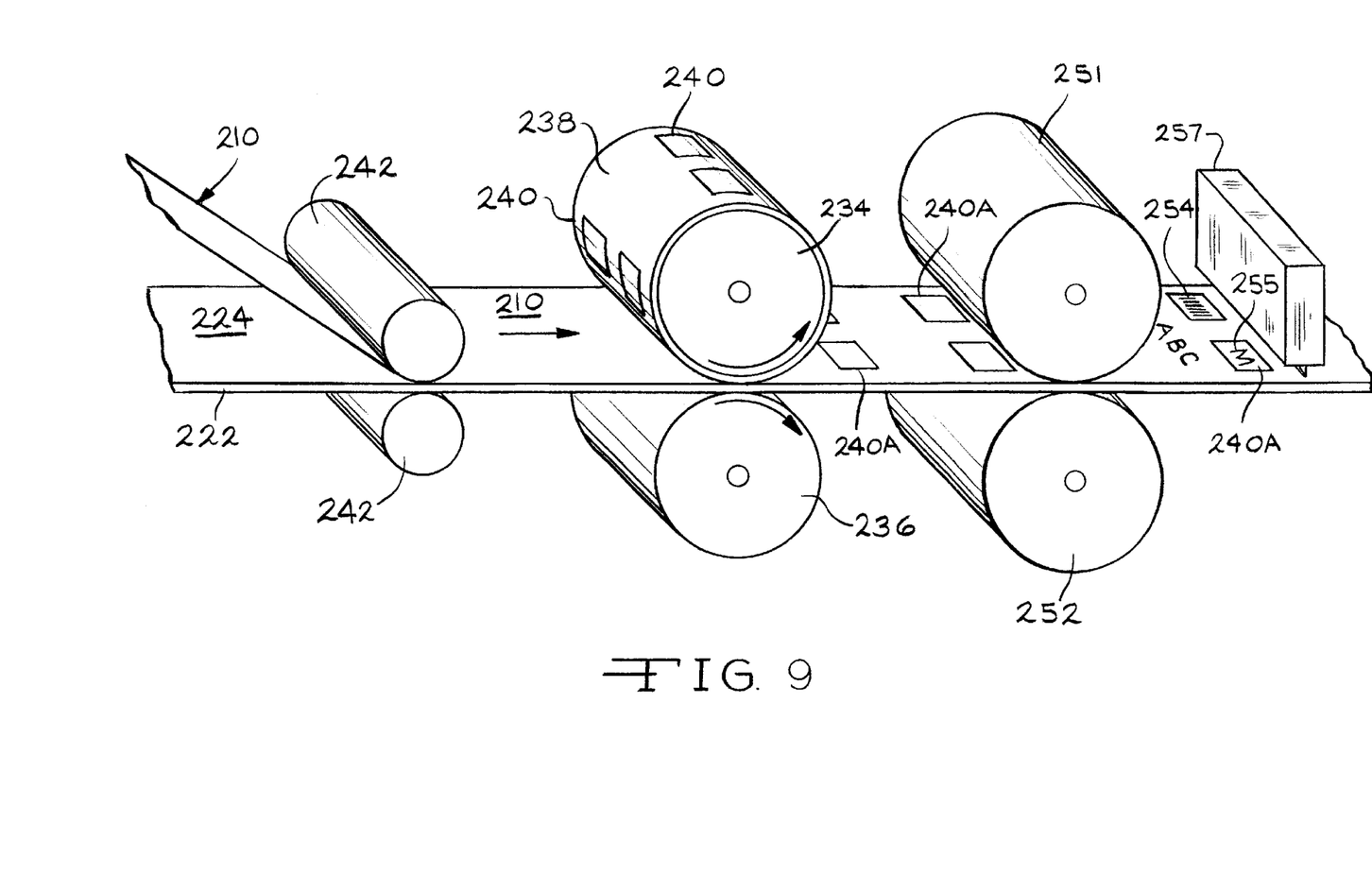
FIG. 9 is a schematic view, in perspective, showing the composite sheet and a substrate being fed between successive pairs of rollers, the first of which has upper one of which has a shim bearing one or more holographic images or diffraction grating images and the second of which applies printing.

Downstream from the heated roller 234 and anvil roller 236 are a printing roller 251 and a second anvil roller 252.

Referring to FIG. 9, there is shown schematically one form of apparatus for engaging the composite sheet 210 to a substrate, embossing a holographic image or diffraction grating image into the composite sheet 210 and, thereafter, printing a design logo, UPC bar code, consecutive numbering or other printing indicia in a continuous, inline operation. As shown in FIG. 9, there is provided a heated roller 234 and an anvil roller 236. The heated roller 234 is shown as having a shim 238 affixed circumferentially therearound. The shim 238 is shown as having a plurality of holographic image or diffraction grating image embossments 240 formed therein.

As shown in FIG. 9, a length of substrate 222 having adhesive 224 facing upwardly is fed from a source of supply, such as a supply roll, between the nip of the heated roller 234 and anvil roller 236. Composite sheet 210 is fed from a supply roll or other source of supply between a pair of idler rollers 242 where it engages the adhesive layer 224 of substrate 222. The composite sheet 210 is facing such that the carrier film 212 contacts the adhesive layer 224 and when so engaged the substrate 222 and composite sheet 210 are passed between the nip of the idler rollers 242 and then between the nip of the heated roller 234 and anvil roller 236. If pressure sensitive adhesive was used for the adhesive layer 224, the composite sheet 210 will become adhered to the substrate 222 upon passing through the nip of the idler rollers 242 without such rollers being heated. If heat activatible adhesive were used, at least one of the idler rollers 242 will be heated in order to activate the heat activatible adhesive of the adhesive layer 224 thereby causing the composite sheet 210 to become adhered to the substrate 222. Additionally, the holographic image or diffraction grating image embossments 240 of the shim 238 emboss holographic images or diffraction grating images 240A into the lacquer overlay 220, layer of metal 218 and second layer of lacquer 216.

The composite sheet 210 and adhered substrate 222 with the embossed holographic images or diffraction grating images 240 thereon then pass between the nip of printing roller 251 and a second anvil roller 252 where desired printing is applied to the face of the composite sheet bearing the holographic or diffraction grating images 240A. Some of the printing may appear, for example as a UPC bar code 254 located within or, if desired, outside of the holographic image 240A. If desired, a different type of image 255 could be positioned in some of the other holographic images 240A and still others such as those designated by the letters A, B, C could be located wholly outside of the holographic images or diffraction grating images. Conventional techniques may be utilized to obtain the desired registration of the printing (254, 255 etc.) relative to the holographic images or diffraction grating images 240A.

After the printing operation and exit from the printing roll 251 and second anvil roll 252, the sheet may pass through a cutter 257 which cuts the composite sheet 210 and substrate 222 with the holographic images 240A and the desired printing 254, 255 into the desired size.

Figure 10:
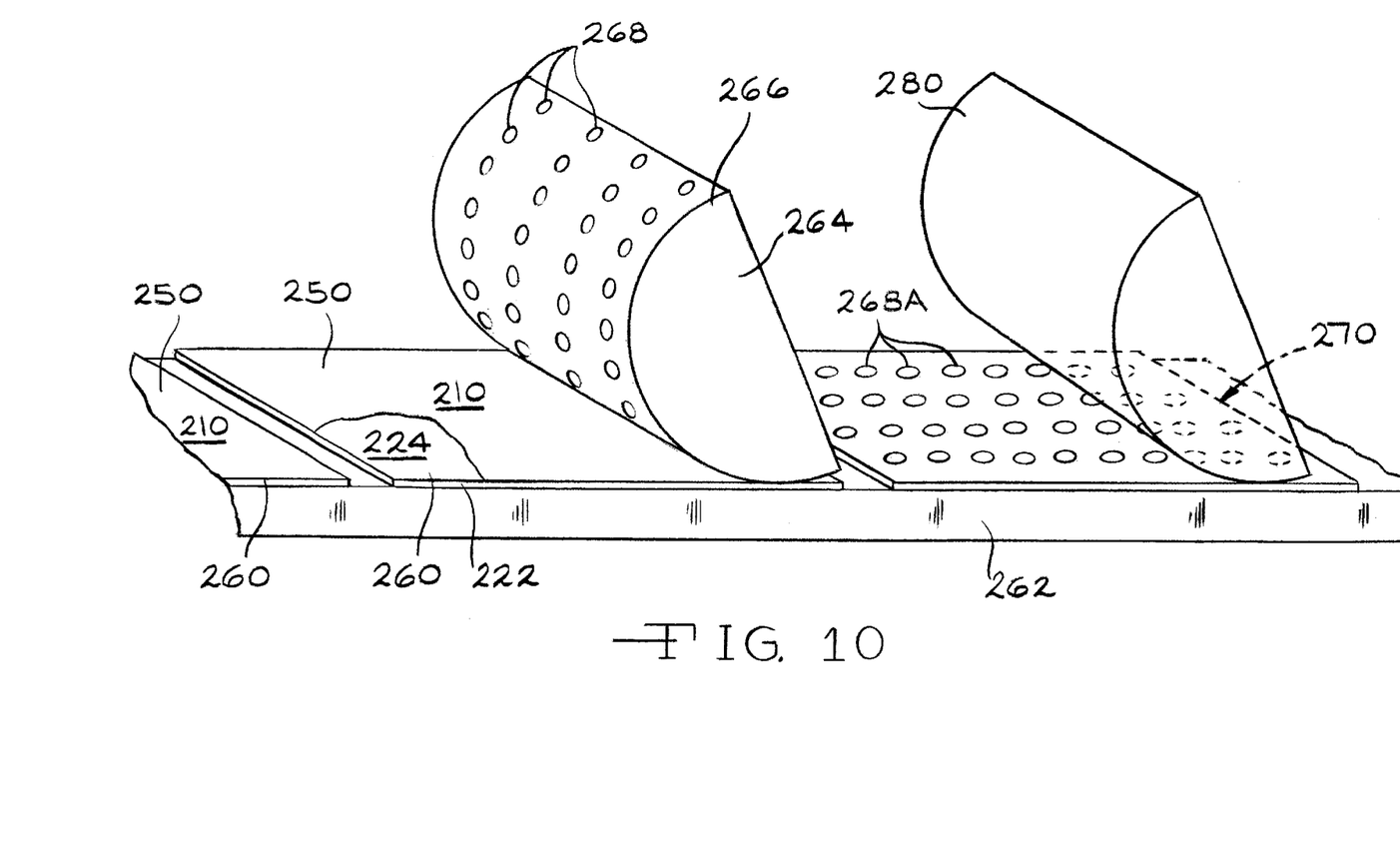
FIG. 10 is a schematic view, in perspective, showing the successive feeding of discrete sheets of (1) substrate and (2) composite sheets to a heated semi-cylindrical roller having a shim bearing one or more holographic images or diffraction grating images and then to a printer.

Referring to FIG. 10, there is shown schematically a form of apparatus for affixing a succession of discrete sections 250 of composite sheet material 210 to discrete sections 260 of substrate 222 coated with adhesive 224.

As shown in FIG. 10, discrete sections 260 of the adhesive coated substrate 222 with the adhesive layer 224 facing up are fed successively on a flat support member 262 to a heated semi-cylindrical roller 264 having affixed to its outer periphery a shim 266 in which has been engraved a plurality of holographic image or diffraction grating image embossments 268. Following positioning of the joined discrete section 250 of composite sheet 210 and discrete section 260 of substrate 222, the semi-cylindrical roller 264 is caused to roll throughout its semi-cylindrical extent over the surface of the discrete sheet 250. The semi-cylindrical roller 264 is heated and presses the discrete section 250 against the discrete section 260 thereby adhering such discrete section 250 to the underlying discrete section 260 of substrate 222 while at the same time causing the embossments 268 to form holographic or diffraction grating images 268A into the lacquer overlay 220, layer of metal 218 and second layer of lacquer 216 of the discrete section 250 of the composite sheet 210. The semi-cylindrical roller 264 may then be removed from contact with the newly embossed product 270 thereby permitting such product 270 to be moved downstream on the flat support member 262 and the next discrete section 260 of substrate 222 with a discrete section 250 of composite sheet 210 supported thereon be moved to a position for engagement by the semi-cylindrical roller 264.

The newly embossed product 270 may then move on the flat support member 262 to a position beneath a semi-cylindrical printing die 280 which may print the desired logo onto such product either wholly within the holographic images 268A, wholly outside of such holographic images 268A or partially in and partially outside of such holographic images.

Although the prior art shows the formation of graphic works having both holographic image and printing thereover such as that shown in U.S. Pat. No. 5,889,598, such prior art requires that the holographic image and the printing be done in completely separate operations. Under the present invention, it is possible to perform the step of adhering the composite sheet to the substrate, embossing a holographic image and apply printing following the application of the holographic image in one continuous in-line operation. If desired, of course, the printing could be performed at a later stage in the operation or as a totally separate step in a different location.

Figure 11:
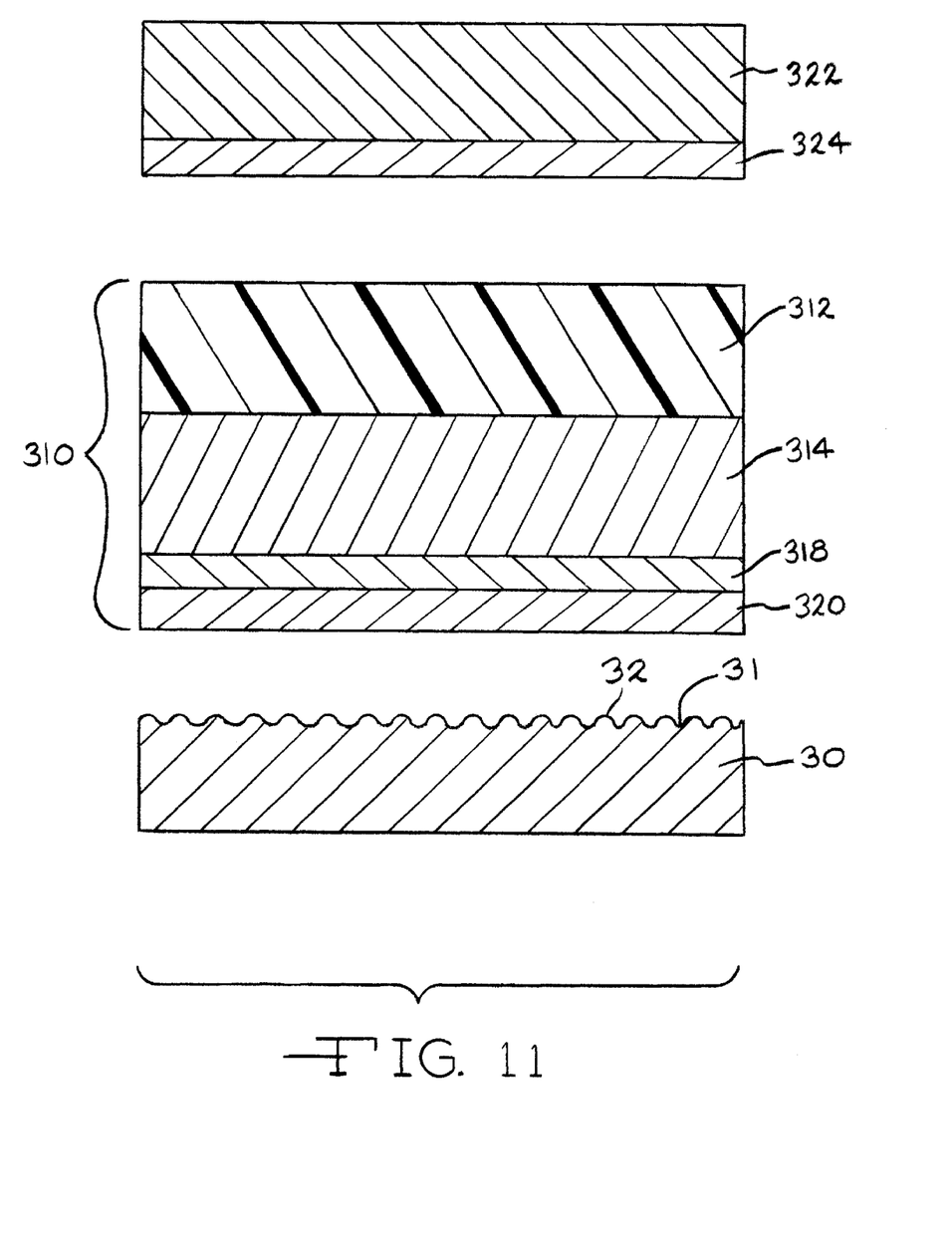
FIG. 11 is a view similar to FIG. 1 showing a further modified composite sheet.
Figure 12:
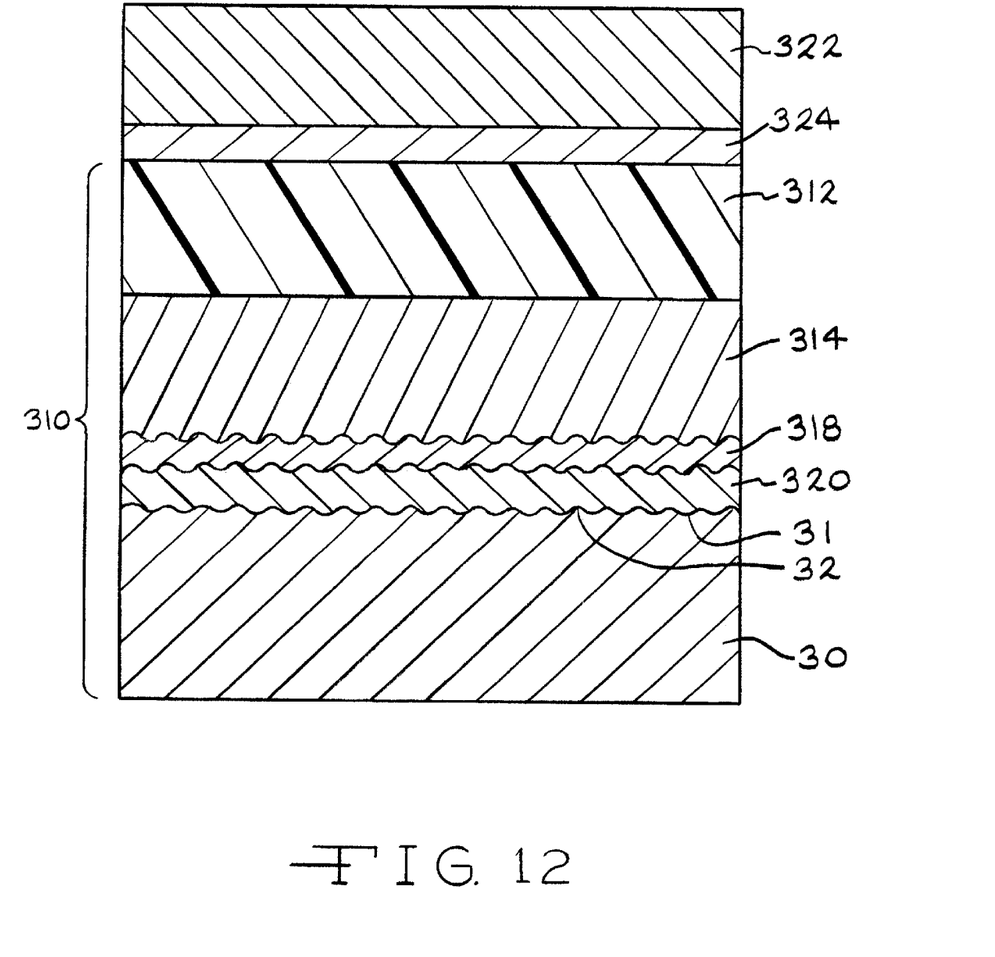
FIG. 12 is a view showing the shim engaged to the further modified composite sheet of FIG. 11.

Referring to FIGS. 11 and 12, there is shown a modified composite sheet generally designated by the numeral 310. The composite sheet 310 comprises a carrier film 312 having a thickness in the preferred range of 12 microns to 125 microns and potentially as thick as 250 microns. The carrier film 312 may be formed of one of a number of different types of material including a film of polyester such as polyethylene terephthalate or a film of bi-axially oriented polypropylene, cellulose triacetate, polystyrene, polyethylene or polyvinylchloride. A lacquer layer 314 having a thickness in the range of 0.5 to 3 microns is applied to the carrier film 312. The layer of lacquer 314 is preferably a thermal softening lacquer applied from solution and containing acrylic and/or nitrocellulose and/or chlorinated rubber.

A layer of metal 318 having a thickness in the range of 20 millimicrons to 100 millimicrons is applied to the layer of lacquer 314. The layer of metal 318 is preferably aluminum; however, it could be stainless steel, nichrome, gold, silver, platinum or any other metal which could be vaporized and deposited by vacuum deposition or applied by sputter or electron beam deposition.

An lacquer overlay coating 320 is applied over the metal layer 318 and preferably has a thickness in the range of 0.025 micron to 1 micron.

In use, the modified composite sheet 310 may be adhered to a substrate 322 such as paper, paperboard, fiberboard, plastic or other desired material. A layer of adhesive 324 is applied to a substrate 322 and functions to adhere the composite sheet 310 thereto.

The shim 30 having a face 31 with a holographic image or a diffraction grating image embossment 32 formed therein is positioned such that the holographic or diffraction grating image embossment 32 faces the lacquer overlay 320 of the composite sheet 310. As schematically represented in FIG. 12, the face 31 of the shim 30 and the holographic image or diffraction grating image embossment 32 is urged against the composite sheet 310 under heat and pressure to force the composite sheet 310 into engagement with the adhesive layer 324 engaged to the substrate 322. Such application under heat and pressure activates the adhesive 324 thereby causing the composite sheet 310 to become adhered to the substrate 322 while at the same time causing the holographic image or diffraction grating image embossment 32 of the shim 30 to emboss a holographic image or diffraction grating image into the lacquer overlay 320, the layer of metal 318 and partially into the layer of lacquer 314 to form a holographic image or diffraction grating image in the composite sheet 310 engaged to the substrate 322.

Other modifications will become readily apparent to those skilled in the art.

We claim:

1. A method for making an article comprising the steps of:
    (a) providing a composite sheet having the capability of receiving embossed therein a holographic image or diffraction grating image, said composite sheet including:
        (i) a plastic film carrier layer,
        (ii) a layer of lacquer,
        (iii) a layer of metal,
        (iv) a lacquer overlay on said layer of metal,
    (b) providing a substrate having a layer of adhesive;
    (c) feeding said substrate and said composite sheet to a pressurizing station with said layer of adhesive facing said plastic film carrier layer, said station having a pair of surfaces;
    (d) subjecting said substrate and said composite sheet to pressure from said surfaces to adhere said composite sheet to said substrate; and
    (e) embossing a holographic or diffraction grating image into said lacquer overlay, said layer of metal and at least partially into said layer of lacquer.

2. The method according to claim 1 wherein said composite sheet and said substrate are continuously fed from rolls and further including the step of cutting said composite sheet and substrate after step (e).

3. The method according to claim 1 wherein step (e) occurs prior to step (c).

4. The method according to claim 1 further including the step of printing over said lacquer overlay.

5. The method according to claim 4 wherein said printing forms discrete images and further including the step of registering said discrete images in relation to said holographic or diffraction grating images.

6. The method according to claim 4 further including the step of cutting said composite sheet and substrate after the step of printing.

7. A method for making an article comprising the steps of:
(a) providing a composite sheet having the capability of receiving embossed therein a holographic image or diffraction grating image, said composite sheet including:
  (i) a plastic film carrier layer,
  (ii) a first layer of lacquer,
  (iii) a second layer of lacquer,
  (iv) a layer of metal,
  (v) a layer of lacquer overlay on said layer of metal,
(b) providing a substrate having a layer of adhesive;
(c) feeding said substrate and said composite sheet to a pressurizing station with said layer of adhesive facing said plastic film carrier layer, said station having a pair of surfaces;
(d) subjecting said substrate and said composite sheet to pressure from said surfaces to adhere said composite sheet to said substrate;
(e) embossing a holographic or diffraction grating image into said lacquer overlay, said layer of metal and at least partially into said second layer of lacquer; and
(f) printing on said lacquer overlay.

8. The method according to claim 7 wherein said printing forms discrete images and further including the step of registering said discrete images in relation to said holographic or diffraction grating images.

9. The method according to claim 7 wherein said composite sheet and said substrate are continuously fed from rolls and further including the step of cutting said composite sheet and substrate after step (e).

10. The method according to claim 9 wherein said cutting occurs after step (f).

11. The method according to claim 7 wherein further including the step of cutting said composite sheet and substrate prior to step (f).

12. The method according to claim 7 wherein step (e) occurs prior to step (c).

* * * * *